United States Patent
Dalke

[15] 3,694,743
[45] Sept. 26, 1972

[54] FIELD PLOTTER
[72] Inventor: George W. Dalke, Lawrence, Kans.
[73] Assignee: Interpretation Systems Incorporation, Lawrence, Kans.
[22] Filed: Oct. 1, 1970
[21] Appl. No.: 77,065

[52] U.S. Cl. .................. 324/72, 324/32, 235/61.6 B
[51] Int. Cl. .............................................. G01r 31/02
[58] Field of Search ......... 324/29, 71, 72, 32; 35/9 C, 35/19 A, 41; 235/61.6 B

[56] References Cited

UNITED STATES PATENTS

| | | | |
|---|---|---|---|
| 2,569,817 | 10/1951 | Wolf | 235/61.6 B |
| 2,542,478 | 2/1951 | Clark | 324/71 |
| 2,423,754 | 7/1947 | Bruce | 235/61.6 B |

*Primary Examiner*—Michael J. Lynch
*Attorney*—Schmidt, Johnson, Hovey & Williams

[57] ABSTRACT

A field plotter for conductive sheet analog simulation having constant current sources and calibration circuitry that permits the resistance of the model to be readily accommodated and enables the operator to normalize the contour voltages by establishing the relative contour value of the point on the sheet of highest potential. The sheet is supported on an easel and connections thereto are made from the front with pins that pierce both the sheet and the easel, leads then being attached to the pins at the rear of the easel. A hold-down frame automatically makes contact with the perimeter of the sheet for those models utilizing a grounded outer boundary.

10 Claims, 7 Drawing Figures

INVENTOR.
George W. Dalke

BY
Schmidt, Johnson, Hovey
Williams & Chase
ATTORNEYS.

FIELD PLOTTER

This invention relates to improvements in field plotters for conductive sheet analog simulation.

The field plotter is an electrical device which facilitates the investigation of a wide variety of physical phenomena. Most physical situations involving energy distribution follow the general mathematical formulas defined by Laplace's and Poisson's equations. Such situations can be translated into electrical parameters on the field plotter and investigated in an analog fashion. Applications include diverse two-dimensional problems such as those relating to heat transfer, electrostatic fields, population density, and other phenomena where the distribution of energy is involved.

Field plotting techniques have heretofore been used with analog models, but several problems have been presented that has made general use of field plotters rather impractical, particularly for the scientist or investigator who is not oriented in the electrical arts. A primary problem is that of interpreting the results once equipotential lines have been plotted. The values of voltages along these lines are rather meaningless unless their interrelationship is known and understood, otherwise the solution to the problem or the presentation of the analysis escapes interpretation. Furthermore, the complexity of the plotting apparatus must be held to a minimum from both the standpoints of cost and ease of operation, and a problem has also been presented with respect to the making of solid electrical connections to the medium of the model. Additionally, a field plotter for general use should be capable of accommodating a very wide range of model resistances so that few limitations will be placed on the investigator insofar as the nature of the problem which the plotter is capable of handling.

It is, therefore, an important object of the present invention to provide a field plotter for analog simulation which overcomes the problems and deficiencies discussed hereinabove, resulting in an instrument suitable for diverse applications and which may be easily operated by the untrained investigator.

Another important object of the invention is to provide a field plotter as aforesaid in which the equipotential lines of the analog are normalized with respect to a known reference, thereby facilitating a rapid interpretation of the results obtained.

Still another important object of this invention is to provide a field plotter as aforesaid which is capable of accommodating models of widely varying resistances so as to place no significant limitation on the investigative applications of the instrument.

A further and important object of this invention is to provide a field plotter as aforesaid in which positive electrical connections to the model medium are made in a simple and straightforward manner in order to facilitate rapid setup of the model, and wherein such connections in no way interfere with the plotting of the equipotential lines of the analog.

DETAILED DESCRIPTION

Figure 1:
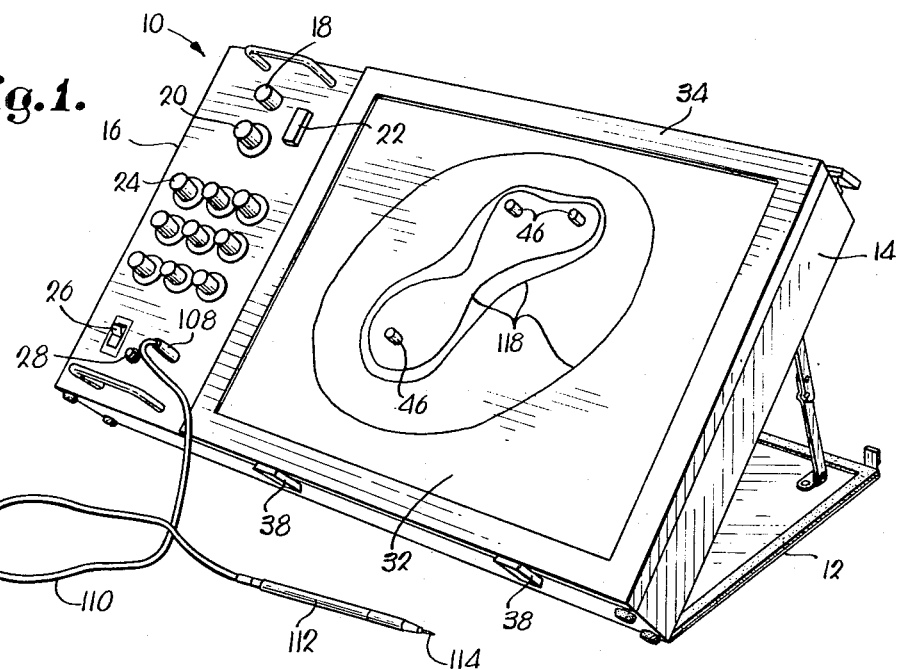
FIG. 1 is a frontal, perspective view of the field plotter showing a simple model with equipotential lines plotted thereon.
Figure 2:
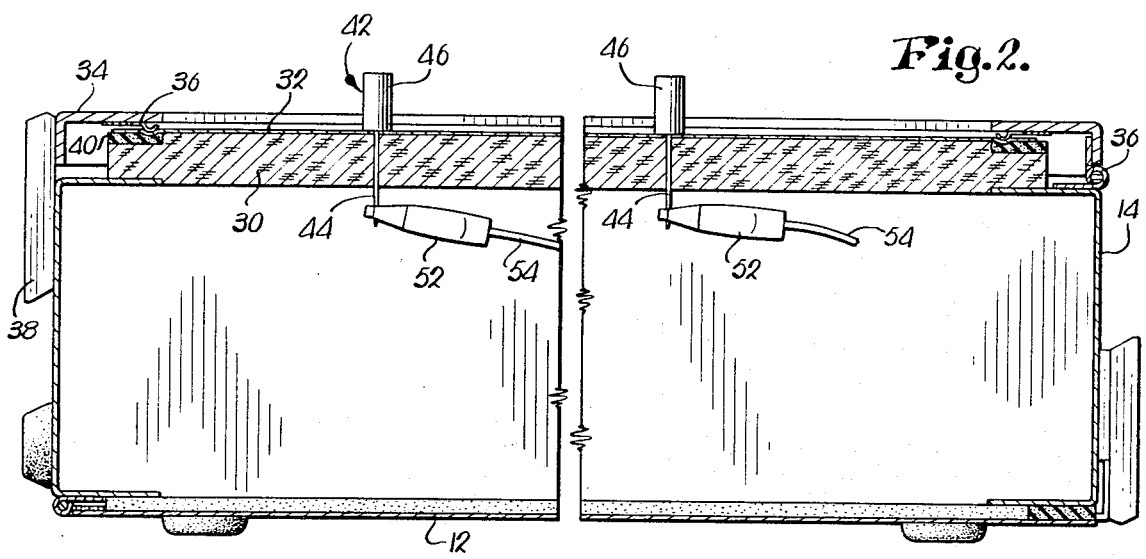
FIG. 2 is an enlarged, fragmentary, cross-sectional view of the easel showing two of the connector pins in contact with the paper sheet.
Figure 4:
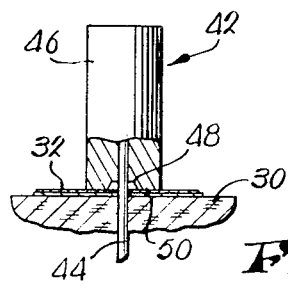
FIG. 4 is a detail view of the contact head of a connector pin, a portion of the head being shown in cross section in engagement with the paper sheet.
Figure 5:
FIG. 5 is a top plan view of the contact head of one of the connector pins.
Figure 3:
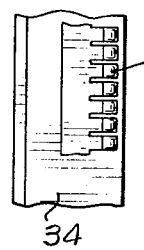
FIG. 3 is a detail view illustrating the finger stock ground strip.

Referring initially to FIGS. 1–5, the field plotter has a case 10 provided with a hinged backplate 12 that, when extended, forms a stand for maintaining an easel portion 14 of the case 10 in an inclined position. A control panel 16 is located on the left side of the easel 14 as viewed in FIG. 1, and includes a calibrator knob 18, a contour selector knob 20, a null meter 22, nine input adjustment knobs 24, an on-off switch 26, and an indicator light 28 associated therewith.

The easel 14 includes a backing member in the form of a corkboard 30 having a front face which receives a paper sheet 32. The sheet 32 comprises the resistive medium of the model under investigation and analysis, a carbon coated cellulose paper being preferred. A rectangular hold-down frame 34 is hinged at 36 on the easel 14. A fingerstock strip 36 is mounted on the backside of the frame 34 and extends completely around the frame to present a rectangular grounding strip which is in contact with the sheet 32 at its perimeter when the frame 34 is in the position illustrated, held in place by a pair of latches 38. The corkboard 30 has a peripheral recess that is filled by a cushion strip 40 of rubber or the like, the strip 40 directly opposing the grounding strip 36.

Electrical contact is made to the sheet 32 by a plurality (as many as nine) of connectors 42, each of which comprises a pin 44 having a contact head 46 recessed at 48 to present an annular contact surface 50 surrounding the longitudinal axis of the pin 44. The pins 44 pierce the sheet 32 and the cork board 30 and thus protrude from the rear thereof, connections being made to the pins 44 by releasable clips 52 from which leads 54 extend to the circuitry of the apparatus described hereinafter.

Figure 6:
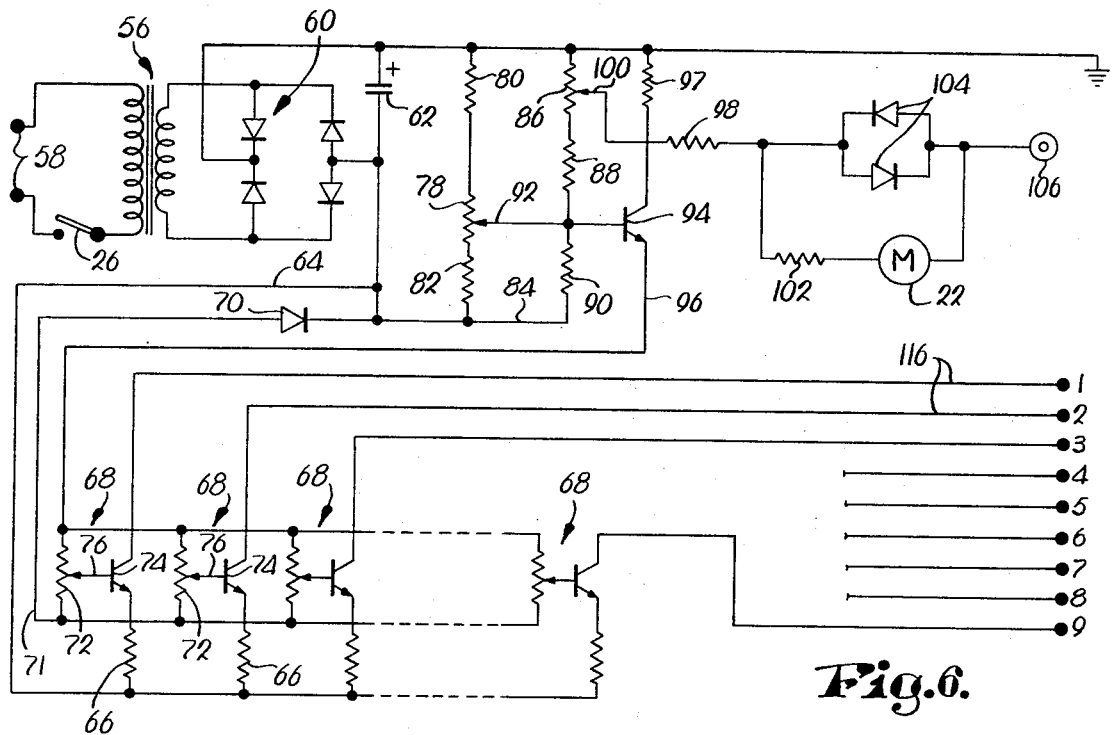
FIG. 6 is an electrical schematic diagram of the field plotter circuitry.

Referring to FIG. 6, a step down transformer 56 has its primary connected to power terminals 58 via the on-off switch 26. A full wave bridge rectifier 60 is connected to the secondary of the transformer 56, and a filter capacitor 62 is connected across the rectifier output. The positive side of the power supply output is at chassis ground as indicated by the symbols. The negative output is delivered along a lead 64 to the emitter resistors 66 of nine constant current sources 68 of identical configuration.

A diode 70 has its cathode connected to the negative supply lead 64 and its anode connected via a lead 71 to the lower end of a potentiometer 72 in each of the sources 68. The active component of each source 68 is an NPN transistor 74 having its base connected to a tap 76 on the respective potentiometer 72. Each of the input adjustment knobs 24 on the control panel 16 is connected to a corresponding tab 76 to provide for manual adjustment thereof.

A calibrate potentiometer 78 is connected by resistors 80 and 82 between the positive ground and a lead 84 which is an extension of the negative supply lead 64. A contour potentiometer 86 is also connected between ground and lead 84, two series resistors 88 and 90 being interposed between potentiometer 86 and lead 84. The tap 92 on the calibrate potentiometer 78 is connected to the common junction of resistors 88 and 90 and is also connected to the base of an NPN emitter follower transistor 94. A lead 96 connects the emitter of transistor 94 to each of the current source potentiometers 72. A resistor 97 is connected between the collector of transistor 94 and ground.

A current limiting resistor 98 is connected to the tap 100 of the contour potentiometer 86, and is in series with a resistor 102 which sets the sensitivity of the null meter 22. A pair of parallel, oppositely poled diodes 104 protect the meter movement from excessive current. A jack 106 is connected to he side of the meter 22 opposite to the series resistors 98 and 102, the jack 106 receiving a plug 108 (FIG. 1) which, via an accompanying lead 110, is connected with a voltage sensing probe 112. A graphite lead 114 serves as the probe tip so that marks may be made on the paper sheet 32 at points of appropriate voltage. The probe 112 is a drafting pencil which is modified by connecting the lead 110 to the end of the metallic pencil body opposite the lead 114.

Nine leads 116 extend from corresponding current sources 68 to nine terminals designated "1" through "9" respectively. One or more of the leads 54 (FIG. 2) extend from these terminals to the pin or pins 44 utilized to form a particular model. The nine knobs 24 carry numerical designations of 1 through 9 and, likewise, the heads 46 of the pins 44 are numbered 1 through 9 as is clear in FIG. 5. Accordingly, a particular knob 24 is identified with a particular pin 44 of the model. The calibration knob 18 adjusts the tap 92 of the calibration potentiometer 78, and the contour selector knob 20 adjusts the tap 100 of the contour potentiometer 86.

OPERATION

Figure 7:
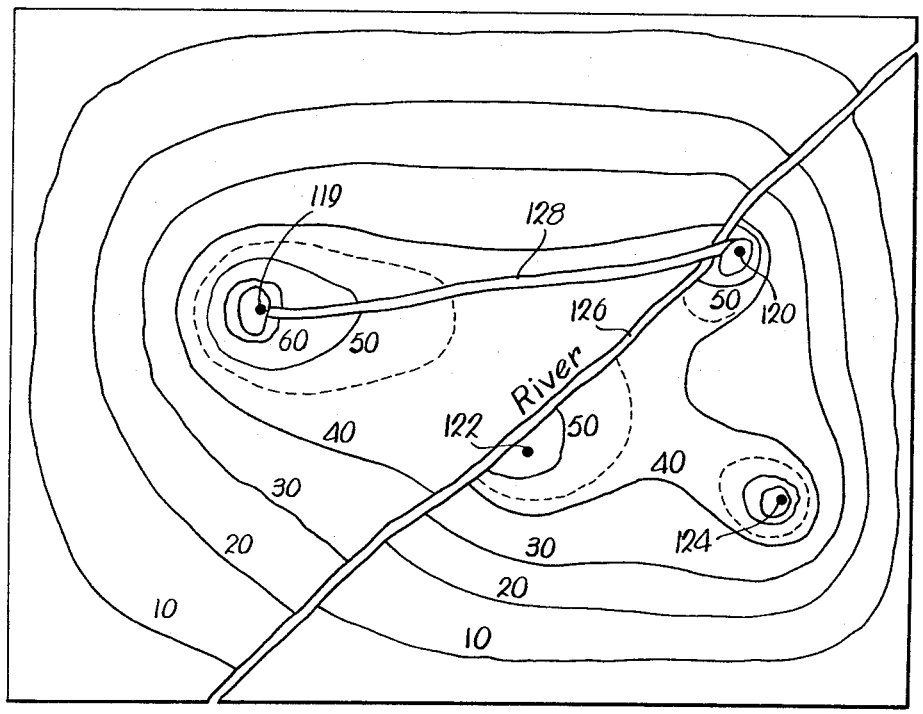
FIG. 7 is an example of an analog obtained as a solution to a particular problem.

Regardless of the nature of the model, the basic operation of the field plotter is the same. In FIG. 1 a simple model is illustrated having three energy sources represented by the contact heads 46 of three of the pin connectors 42. The situation under investigation might, for example, be to determine the interaction of the electric fields generated by three parallel, current-carrying conductors, represented by the three contact heads 46. It should be understood that the fingerstock strip 36 carried by the hold-down frame 34 is connected to chassis ground, thus current flow in the paper sheet 32 is from each of the contact heads 46 outwardly to the circumscribing strip 36. For a paper sheet 32 having a length of 16 inches, the resistance of the carbon coated face thereof between two lines of contact extending along the opposed end edges may, for example, be on the order of 4,000 ohms. However, the resistance of the model between each of the contact heads 46 and the ground boundary may vary widely depending upon the nature of the model, as will subsequently be appreciated when FIG. 7 is discussed. The object is to plot the equipotential lines 118 such as illustrated in FIG. 1, utilizing the lead tip 114 of the pencil probe 112. These equipotential or contour lines constitute an analog simulation and represent the solution to the model.

The pin connectors 42 numbered 1, 2, and 3 would be used to form the simple model illustrated in FIG. 1, together with the grounding strip 36 which is automatically brought into electrical contact with the sheet 32 when the hold-down frame 34 is locked in place with the latches 38. The finger contacts of the strip 36 depress the sheet 32 by virtue of the provision of the cushion strip 40 at the edge of the corkboard backing member 30. Thus, solid electrical contact is assured by the strip 36 at the perimeter of the sheet 32. Provision may be made for providing grounded boundaries or points other than the boundary defined by the strip 36, depending upon the requirements of a given model.

In forming the model illustrated in FIG. 1, the pin connectors 42 identified by the numerals 1, 2, and 3 on their contact heads 46 are selected and inserted through the paper sheet 32 and the corkboard 30 at the desired points. It will be assumed for purposes of illustration that the two adjacent, uppermost contact heads 46 in FIG. 1 are labelled 1 and 2 and that each represents an energy level equal to 5 on a relative scale of from 0 to 10, and that the lowermost contact head 46 is number 3 and has an energy level equal to 8. The leads 54 from the number 1, 2, and 3 output terminals of the constant current sources 68 are connected to the protruding pins 44 of corresponding designation, thus the operator knows that the input knobs 24 numbered 1, 2, and 3 control the energy inputs to the correspondingly numbered contact heads 46. Accordingly, knobs 24 numbered 1 and 2 are set at 5 and the third knob is set at 8. (The relative scale of 0 to 10 corresponds to 0 to 100 percent of the current available at the output of each of the constant current sources 68, the 100 percent condition occurring when the tap 76 of the potentiometer 72 is set such that the full resistance of the potentiometer 72 is connected between the base of the transistor 74 and the lead 71.)

At this juncture, it is instructive to note that each of the constant current sources is of identical circuit configuration. Representative values are 10,000 ohms for the potentiometer 72 and 1,000 ohms for the resistor 66, with a DC output level from the power supply of −38 volts with respect to chassis ground. The voltage drop across the diode 70 is 0.6 volts, and the voltage drop between the base and emitter of the transistor 74 yields a voltage at the emitter of 0.6 volts below the base voltage. The potentiometer 72, therefore, is connected between a voltage on lead 71 of 0.6 volts below the power supply output and a voltage on lead 96 determined by the setting of the tap 92 on the calibration potentiometer 78. A very high gain transistor is selected for the transistor 74, thus its collector current can be assumed to be equal to its emitter current. Accordingly, the output current from an individual source 68 is equal to the percentage of the resistance of the potentiometer 72 between tap 76 and lead 71, multiplied by $$(V_{bias} - V_{cal})/1,000 \text{ ohms}$$

where $V_{bias}$ is the voltage on lead 71 and $V_{cal}$ is the calibration voltage appearing on lead 96. Thus, the output current is a direct function of the potentiometer setting and will always be a certain percentage of the total current available as selected by the setting of the tap 76, but the absolute value of the output current will be determined by the calibration voltage on lead 96. This is true for all of the current sources 68, therefore the calibration voltage on lead 96 determines the absolute values of the currents appearing at the outputs of the sources 68, but their relative values, expressed as a percentage of the maximum, remain unaffected.

Returning to the exemplary model illustrated in FIG. 1, once the knobs 24 controlling the current delivered to the three contact heads 46 are set at their relative values as discussed hereinabove, a calibration procedure is followed which establishes the relative contour value of the point of highest potential in the modeled system. This value is normally selected as the 100 percent contour so that, for convenience, lesser contour levels will be expressed directly as a percentage of the highest potential in the system, thereby eliminating the subsequent need to normalize results in terms of percentages of a reference value.

To proceed with calibration, the contour selector knob 20 is set at 100 percent, which corresponds to locating the tap 100 of the contour potentiometer 86 at the lower end of the potentiometer resistor. Accordingly, maximum negative voltage with respect to ground appears at the tap 100 and is sensed by the meter 22. The operator is aware that the highest potential will be at one of the contact heads 46, and in more sophisticated models the heads are individually probed until the highest potential is found. In probing from head to head, the tip 114 of the probe 112 is placed on a particular contact head 46 and, if the meter 22 deflects in a direction indicating that the voltage at such head is greater than the 100 percent contour voltage at tap 100, the calibration knob 18 is adjusted to move the tap 92 in the calibration potentiometer 78 away from ground to decrease the output levels of the current sources 68 until a balance is obtained (meter movement centered on 0). This is repeated as needed as the other heads are probed until, ultimately, the meter 22 will indicate a balance of voltages only when the one head is probed having the highest potential in the system. All other heads will then indicate a voltage less than the 100 percent contour voltage.

When calibration has been completed, the operator is ready to plot the contour lines that represent the solution to the model. For practical purposes, 10 contour lines or less will generally suffice. The particular contour levels selected for plotting should be chosen to provide the most information possible with regard to the specific model. Since these levels will vary with the model, some experimentation may be necessary.

In plotting a contour, the contour level selected is first set on the contour selector knob 20. The three contour lines 118 illustrated in FIG. 1 are 20, 40, and 43 percent contours respectively from the outside to the inside. With the knob 20 at a particular setting, the tip 114 of the probe 112 is placed in contact with the sheet 32 and is moved thereover until the meter 22 indicates a balance. This point is marked and then subsequent points where the meter balances are marked, whereupon a line connecting these points represents the contour level indicated by the knob setting.

Referring to FIG. 7, a more complex model is illustrated along with the plotted analog solution. The problem is geographical and is concerned with the influence of barriers and expediters on population potential. Four cities are centered at 119, 120, 122 and 124. These are the locations of the energy inputs (connector pins), the relative energy levels thereof being 10.0, 2.5, 2.5, and 10.0. Accordingly, the northwest and southeast cities centered at 119 and 124 have four times the population of the two towns centered at 120 and 122. The two towns are located by a river 126, and a road 128 bridges the river and joins the city 119 and the town 120. The river 126 is formed on the model by severing the paper sheet to interrupt electrical continuity, thus no current can flow from one bank of the river to the other. The road 128 is formed by a paint applied to the sheet having greater conductivity than the carbon coated surface. The 10, 20, 30, 40, 50, and 60 percent contour lines of the solution are designated, and the broken lines represent the 45 percent contour level. The solution reveals that the general population potential north of the river is greater, owing to the road 128. The area south of the river reflects less interaction among the cities because of the absence of roads.

By virtue of the calibration procedure discussed hereinabove, the contour lines on the model of FIG. 7 are read directly in percentages, thus the solution may be readily interpreted once the contour lines are plotted, without the need for mathematical calculations. Furthermore, the resistance of the model has changed from that of the paper sheet alone due to the river 126 and the road 128. However, this constitutes no obstacle to effective use of the present invention since it is readily adapted to a wide range of model resistances.

In this latter regard, it should be noted that the tap 92 on the calibrate potentiometer 78 is connected to the junction of the resistors 88 and 90, thus the contour voltage at the tap 100 of the contour potentiometer 86 is affected by the setting of the calibration tap 92. During the calibration procedure, if the resistance of the model is too low for the calibration setting, as the tap 92 is moved toward ground the maximum current available from the current sources 68 increases, and the contour voltage at the tap 100 simultaneously decreases. With increased current input to the model, the IR drops are greater. The contour voltage at tap 100, however, has decreased so that the current input needed to match the 100 percent contour voltage is not as great as would otherwise be the case. This same dual compensating action is achieved when the resistance of the model is high, since the contour voltage increases as the calibration tap 92 is moved away from ground to decrease the current input to the model. The emitter follower 94 serves to transfer the voltage on the calibration tap 92 to the current sources 68 without loading the calibration circuit.

As the model to be analyzed becomes more complex and more current inputs are used, it becomes increasingly clear that the single calibration control provided by the knob 18 and associated movable tap 92 provides a means of normalizing a solution that would otherwise require extensive mathematical interpretation. Although the possibility of employing nine current inputs to the model is illustrated herein, any number can be provided by simply adding additional constant current sources. Regardless of the settings of the taps 76 on the various potentiometers 72 of the current sources 68, the ratios of their current outputs remain constant regardless of the variation of the absolute values thereof required to properly calibrate the apparatus prior to plotting the contours. It should be understood that this ability to simultaneously vary the output current levels of the sources 68, of itself, renders the apparatus capable of handling a wide range of model resistances even without the dual compensation arrangement discussed above. However, simultaneous variation of the contour voltage as the calibration tap 92 is adjusted is preferred due to the enhanced compensation.

Other important aspects of the present invention relate to the manner in which electrical connections are made with the paper sheet 32. Since constant current sources are utilized, the contact resistance of the heads 46 against the sheet 32 is not critical. Accordingly, the pin connectors 42 may simply be pushed through the sheet 32 and corkboard 30 until the annular contact surfaces 50 engage the coated surface of the paper. By virtue of their annular configuration, the ease of making solid contact with the coating is enhanced and relatively low resistance connections are assured. The pin 44 of each connector is frictionally held by the corkboard 30, thereby retaining the contact surface 50 in engagement with the sheet 32.

Furthermore, the leads to the pin connectors do not in any way interfere with the plotting of the equipotential contour lines. Since all connections are made at the rear of the easel 14, the front of the easel is entirely unobstructed so that points may be rapidly plotted and the connecting contour lines drawn.

It should be understood that the constant current sources 68 illustrated herein are purely exemplary and may be replaced with sources of greater stability for applications where high accuracy is desired. Operational characteristics of the sources 68 discussed hereinabove assume that the transistors 74 are neither saturated or near cutoff. The apparatus will not calibrate when one of the transistors 74 is saturated, and the cutoff region may be avoided by setting the potentiometers 72 at 10 percent or above. This permits the operator to utilize current source settings of from 10 to 100 percent without regard to absolute values of current, thus the ratios of the energy inputs to the model may be as high as 10 to 1 and still be within the capabilities of the sources 68.

Having thus described the invention, what is claimed as new and desired to be secured by Letters Patent is:

1. Apparatus for plotting an electrical analog of a physical situation, said apparatus comprising:
   a resistive medium adapted for modeling in accordance with the characteristics of said situation, said medium comprising a sheet member;
   a pierceable backing member having a front face receiving said sheet member thereon and supporting the latter;
   a plurality of input signal sources, each of which is provided with means for selectively setting its output at a predetermined level relative to the other sources;
   a plurality of connectors for establishing electrical contact with selected contact points on said medium, each of said connectors comprising an electrically conductive pin adapted to pierce said members and provided with a contact head in engagement with said sheet member when the pin has pierced both of said members and extends therethrough;
   means for coupling said connectors with the outputs of corresponding input signal sources for flow of currents along the medium from the connectors in contact therewith, whereby voltages are developed in the medium in accordance with the magnitudes and interaction of said currents, said coupling means being connectable at the rear of said backing member with the pins extending therethrough;
   contour plotting means for providing a selectively variable contour voltage, and having a voltage sensing probe for contacting said medium and means for indicating the amplitude relationship between the sensed voltage and a selected contour voltage; and
   calibration means coupled with said input signal sources for varying the selected output levels thereof while maintaining the ratios of said selected levels constant, whereby the selected levels may be adjusted to normalize the selected contour voltages by establishing the relative contour value of the point on the medium of highest potential.

2. The apparatus as claimed in claim 1, said calibration means having a control for simultaneously effecting said variation of the selected output levels while maintaining the ratios thereof constant.

3. Apparatus for plotting an electrical analog of a physical situation, said apparatus comprising:
   a resistive medium adapted for modeling in accordance with the characteristics of said situation, said medium comprising a sheet member;
   a pierceable backing member having a front face receiving said sheet member thereon and supporting the latter;
   a plurality of constant current sources, each of which is provided with means for selectively setting its output current at a predetermined level relative to the other current sources;
   a plurality of connectors for establishing electrical contact with selected contact points on said medium, each of said connectors comprising an electrically conductive pin adapted to pierce said members and provided with a contact head in engagement with said sheet member when the pin has pierced both of said members and extends therethrough;
   means for coupling said connectors with the outputs of corresponding current sources for flow of currents along the medium from the connectors in contact therewith, whereby voltages are developed in the medium in accordance with the magnitudes and interaction of said currents, said coupling means being connectable at the rear of said backing member with the pins extending therethrough;

contour plotting means for providing a selectively variable contour voltage, and having a voltage sensing probe for contacting said medium and means for indicating the amplitude relationship between the sensed voltage and a selected contour voltage; and calibration means coupled with said current sources for varying the selected output current levels thereof while maintaining the ratios of said selected levels constant, whereby the selected levels may be adjusted to accommodate the resistance of the model and to normalize the selected contour voltages by establishing the relative contour value of the point on the medium of highest potential.

4. The apparatus as claimed in claim 3, said calibration means having a control for simultaneously effecting said variation of the selected output current leads while maintaining the ratios thereof constant.

5. The apparatus as claimed in claim 3, said calibration means being operable to provide a calibration signal and having selectively operable control means for varying the magnitude of said calibration signal, said current sources having a common control input for receiving said calibration signal, and each of said sources delivering its output current in accordance with the magnitude of said calibration signal.

6. The apparatus as claimed in claim 5, said contour plotting means including a control for varying said contour voltage and selectively setting the latter at either a predetermined maximum amplitude or a lesser amplitude which is a known percentage of the maximum amplitude.

7. The apparatus as claimed in claim 6, said indicating means being operable to compare the amplitudes of the selected contour voltage and said sensed voltage and indicate when said amplitudes are equal.

8. The apparatus as claimed in claim 6, said calibration means being coupled with said contour plotting means for increasing or decreasing the predetermined maximum amplitude of said contour voltage as said selected output current levels are decreased or increased respectively.

9. The apparatus as claimed in claim 3, the contact head of each of said pins having an annular contact surface in surrounding relationship to the piercing axis of the pin.

10. Apparatus for plotting an electrical analog of a physical situation, said apparatus comprising:

a resistive medium adapted for modeling in accordance with the characteristics of said situation, said medium comprising a sheet member, there being a backing member receiving said sheet member thereon and supporting the latter;

a hold-down frame shiftable to a position clamping the perimeter of the sheet member between the frame and the backing member;

a plurality of input signal sources, each of which is provided with means for selectively setting its output at a predetermined level relative to the other sources;

a common return circuit coupled with the outputs of said input signal sources and including a contact element carried by said frame and engaging the perimeter of the sheet member in circumscribing relationship thereto when the frame is in said position;

a plurality of connectors for establishing electrical contact with selected contact points on said medium;

means for coupling said connectors with the outputs of corresponding input signal sources for flow of currents along the medium from the connectors in contact therewith, whereby voltages are developed in the medium in accordance with the magnitudes and interaction of said currents;

contour plotting means for providing a selectively variable contour voltage, and having a voltage sensing probe for contacting said medium and means for indicating the amplitude relationship between the sensed voltage and a selected contour voltage; and calibration means coupled with said input signal sources for varying the selected output levels thereof while maintaining the ratios of said selected levels constant, whereby the selected levels may be adjusted to normalize the selected contour voltages by establishing the relative contour value of the point on the medium of highest potential.

* * * * *